United States Patent
Yun et al.

(10) Patent No.: US 12,323,044 B2
(45) Date of Patent: Jun. 3, 2025

(54) 3-LEVEL-INVERTING BUCK-BOOST CONVERTER AND CONTROL METHOD THEREOF

(71) Applicant: Samsung Electronics Co., Ltd., Suwon-si (KR)

(72) Inventors: Chuleun Yun, Suwon-si (KR); Kisun Lee, Suwon-si (KR); Hangseok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 17/817,629

(22) Filed: Aug. 4, 2022

(65) Prior Publication Data

US 2023/0058431 A1 Feb. 23, 2023

Related U.S. Application Data

(63) Continuation of application No. PCT/KR2022/006132, filed on Apr. 28, 2022.

(30) Foreign Application Priority Data

Aug. 4, 2021 (KR) .......... 10-2021-0102584
Sep. 30, 2021 (KR) .......... 10-2021-0129418

(51) Int. Cl.
*H02M 3/07* (2006.01)
*H02M 1/00* (2006.01)
(Continued)

(52) U.S. Cl.
CPC .......... *H02M 1/0095* (2021.05); *H02M 3/07* (2013.01); *H02M 3/1582* (2013.01); *H02M 3/1584* (2013.01); *H02M 7/4837* (2021.05)

(58) Field of Classification Search
CPC .. H02M 7/483; H02M 7/4837; H02M 1/0095; H02M 3/07; H02M 3/158; H02M 3/1582; H02M 3/1584
See application file for complete search history.

(56) References Cited

U.S. PATENT DOCUMENTS 6,657,875 B1 * 12/2003 Zeng .............. H02M 3/07
363/59
2011/0141089 A1 6/2011 Lee
(Continued)

FOREIGN PATENT DOCUMENTS

EP 2078334 B1 10/2011
JP 2011-078290 A 4/2011
(Continued)

OTHER PUBLICATIONS

International Search Report dated Aug. 10, 2022 in connection with International Patent Application No. PCT/KR2022/006132, 2 pages.
(Continued)

*Primary Examiner* — Alex Torres-Rivera

(57) ABSTRACT

An electronic device includes: a first DC/DC converter including switches, a first capacitor, and a first inductor; and control circuit configured to control on/off states of the switches. In an on state, the switches include: a first switch configured to connect one end of the first capacitor to the input power source; a second switch configured to connect the one end of the first capacitor to one end of the first inductor; a third switch configured to connect another end of the first capacitor to the one end of the first inductor; and a fourth switch configured to connect the other end of the first capacitor to an output terminal of the first DC/DC converter. The first inductor includes the one end connected to the other end of the second switch and the one end of the third switch, and another end connected to a ground.

20 Claims, 10 Drawing Sheets

(51) Int. Cl.
*H02M 3/158* (2006.01)
*H02M 7/483* (2007.01)

(56) References Cited

U.S. PATENT DOCUMENTS

| | | |
|---|---|---|
| 2011/0157141 A1 | 6/2011 | Woo et al. |
| 2015/0002066 A1 | 1/2015 | Oda et al. |
| 2019/0260306 A1* | 8/2019 | Ma ................. H02M 3/158 |
| 2019/0379287 A1 | 12/2019 | Zhang et al. |
| 2020/0228016 A1* | 7/2020 | Wu ................... H02M 1/08 |
| 2021/0083597 A1 | 3/2021 | Hayashi |
| 2021/0242768 A1 | 8/2021 | Ishikura |
| 2021/0313891 A1* | 10/2021 | Chakraborty ....... H02M 1/0095 |
| 2022/0209660 A1* | 6/2022 | Sun ................. H02M 3/158 |
| 2022/0311339 A1* | 9/2022 | Yen ................. H02M 3/158 |

FOREIGN PATENT DOCUMENTS

| | | |
|---|---|---|
| JP | 2011-193583 A | 9/2011 |
| JP | 2017-060272 A | 3/2017 |
| JP | WO2018131384 A1 | 7/2018 |
| JP | WO2020085008 A1 | 4/2020 |
| KR | 10-2011-0065851 A | 6/2011 |
| KR | 10-2011-0075515 A | 7/2011 |
| KR | 10-2013-0076669 A | 7/2013 |
| KR | 10-2014-0013863 A | 2/2014 |
| KR | 10-1434849 B1 | 9/2014 |
| KR | 10-2018-0103238 A | 9/2018 |
| KR | 10-2018-0105479 A | 9/2018 |
| KR | 10-2020-0064557 A | 6/2020 |
| KR | 10-2020-0083789 A | 7/2020 |
| KR | 10-2020-0122055 A | 10/2020 |
| WO | 2019207772 A1 | 10/2019 |

OTHER PUBLICATIONS

Written Opinion of the International Searching Authority dated Aug. 10, 2022 in connection with International Patent Application No. PCT/KR2022/006132, 3 pages.

* cited by examiner

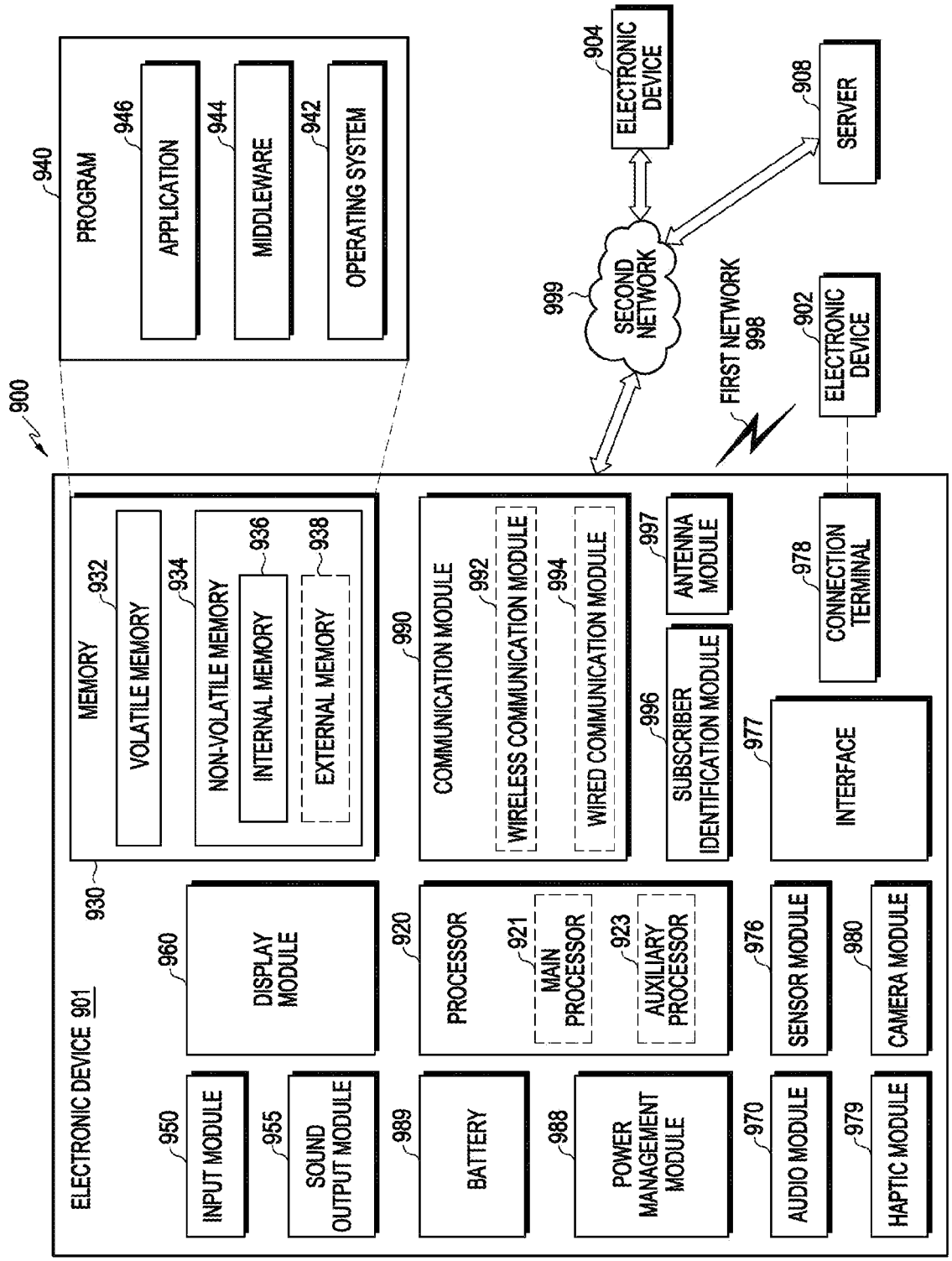

3-LEVEL-INVERTING BUCK-BOOST CONVERTER AND CONTROL METHOD THEREOF

CROSS-REFERENCE TO RELATED APPLICATIONS

This application is a bypass continuation of PCT International Application No. PCT/KR2022/006132, which was filed on Apr. 28, 2022, and which is based on and claims priority to Korean Patent Application No. 10-2021-0102584, filed on Aug. 4, 2021, and to Korean Patent Application No. 10-2021-0129418, filed on Sep. 30, 2021, in the Korean Intellectual Property Office, the disclosures of which are incorporated by reference herein in their entireties.

BACKGROUND

1. Field

Various embodiments of the disclosure generally relate to a three-level inverting buck-booster converter and a method for controlling the same.

2. Description of Related Art

A direct-current (DC)/DC converter may receive a DC voltage, may convert the DC voltage into a DC voltage of a configured level, and may output the DC voltage. For example, the DC/DC converter may include a boost converter (or step-up converter) that converts a relatively low input voltage into a relatively high output voltage, a buck converter (or step-down converter) that converts a relatively high input voltage into a relatively low output voltage, and a buck-booster converter that is capable of converting an input voltage into a relatively low output voltage or a relatively high output voltage according to switching control.

SUMMARY

A general inverting buck-boost converter may include two switches, an inductor, and a capacitor, and an output voltage higher than an input voltage or an output voltage lower than an input voltage may be provided through switching control for the inverting buck-boost converter.

To increase the voltage conversion efficiency of the inverting buck-boost converter, it is helpful to reduce ripples of a current flowing in the inductor (hereinafter, "inductor current"). To reduce ripples of the inductor current, a high-inductance inductor may be used, and/or a high switching frequency (or short switching period) may be used.

However, when a high-inductance inductor is used in the inverting buck-boost converter, an area and/or height for mounting the inductor may increase, and the internal resistance of the inductor may cause an increase in loss. In addition, when the switching frequency of the inverting buck-boost converter is increased, loss (e.g., switching loss) in switches included in the inverting buck-boost converter may increase.

According to various embodiments, an electronic device including a three-level inverting buck-boost converter including four switches and a capacitor (e.g., a flying capacitor) and a control method thereof may be provided.

According to various embodiments, an electronic device including a plurality of three-level inverting buck-boost converters operating with phases opposite to each other and a control method thereof may be provided.

According to various embodiments, an electronic device in which inductors of a plurality of three-level inverting buck-boost converters form coupled inductors and a control method thereof may be provided.

According to various embodiments, an electronic device may include: a first DC/DC converter including a plurality of switches, a first capacitor, and a first inductor; and at least one control circuit configured to control on/off states of the plurality of switches, wherein the plurality of switches may include: a first switch including one end connected to an input power source and to connect one end of the first capacitor to the input power source in an on state; a second switch including one end connected to another end of the first switch and to connect the one end of the first capacitor to one end of the first inductor in the on state; a third switch including one end connected to another end of the second switch and to connect another end of the first capacitor to the one end of the first inductor in the on state; and a fourth switch including one end connected to another end of the third switch and to connect the other end of the first capacitor to an output terminal of the first DC/DC converter in the on state, the first capacitor may include the one end connected to the other end of the first switch and the one end of the second switch, and the other end connected to the other end of the third switch and the one end of the fourth switch, and the first inductor may include the one end connected to the other end of the second switch and the one end of the third switch, and another end connected to a ground.

According to various embodiments, compared to a general inverting buck-boost converter, a three-level inverting buck-boost converter may provide an inductor current having a low ripple even using an inductor having a relatively low inductance. For example, an electronic device including a three-level inverting buck-boost converter may provide high conversion efficiency without using an inductor having a large size.

According to various embodiments, since a three-level inverting buck-boost converter has less voltage stress applied to each switch than a general inverting buck-boost converter, switches having low internal pressure and low internal resistance may be used, thus reducing switching loss. For example, the voltage conversion efficiency of the three-level inverting buck-boost converter may be increased.

Various effects exerted by the disclosure are not limited to the foregoing effects.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

DESCRIPTION OF THE DRAWINGS

For a more complete understanding of the present disclosure and its advantages, reference is now made to the following description taken in conjunction with the accompanying drawings, in which like reference numerals represent like parts:

FIG. 9 is a block diagram of an electronic device in a network environment according to various embodiments.

DETAILED DESCRIPTION

FIGS. 1A through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1A:
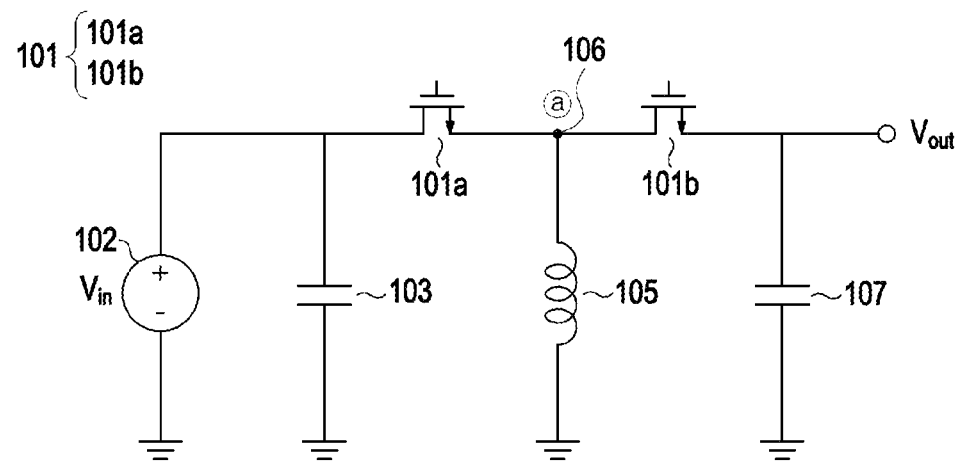
FIG. 1A illustrates components of a DC/DC converter according to a comparative example.
Figure 1B:
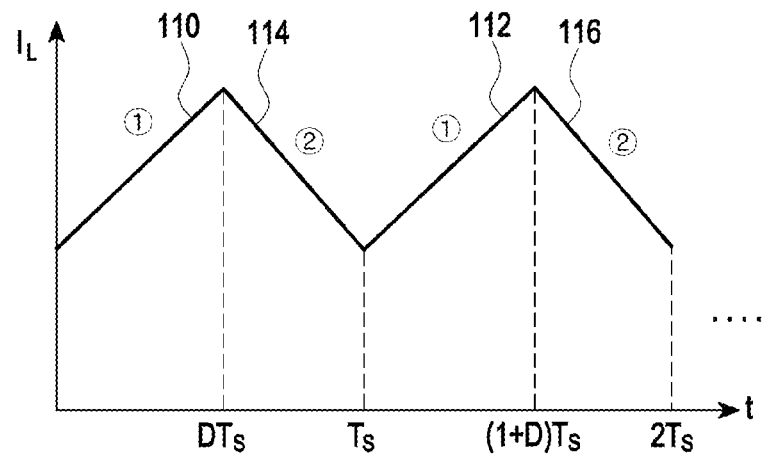
FIG. 1B illustrates a ripple of an inductor current of the DC/DC converter according to the comparative example.

FIG. 1A illustrates components of a DC/DC converter 100 (e.g., an inverting buck-boost converter) according to a comparative example. FIG. 1B illustrates a ripple of an inductor current IL of the DC/DC converter 100 according to the comparative example.

Referring to FIG. 1A, the DC/DC converter 100 according to the comparative example may include a plurality of switches 101, a first capacitor 103 (e.g., an input capacitor), an inductor 105, and/or a second capacitor 107 (e.g., an output capacitor). In FIG. 1A, "Vout" may denote a voltage at an output terminal of the DC/DC converter 100.

The plurality of switches 101 may include a first switch 101a and a second switch 101b. Each of the plurality of switches 101 may be configured as a metal-oxide-semiconductor field-effect transistor (MOSFET).

One end of the first switch 101a may be connected to an input power source 102 (e.g., a DC power source) and one end of the first capacitor 103, and another end of the first switch 101a may be connected to one end of the inductor 105 and one end of the second switch 101b. When the first switch 101a is on, the one end of the inductor 105 may be connected to the input power source 102 and the first capacitor 103. When the first switch 101a is off, the one end of the inductor 105 may be disconnected from the input power source 102 and the first capacitor 103.

The one end of the second switch 101b may be connected to the other end of the first switch 101a and the one end of the inductor 105, and another end of the second switch 101b may be connected to one end of the second capacitor 107 and an output terminal of the DC/DC converter 100. When the second switch 101b is on, the one end of the inductor 105 may be connected to the one end of the second capacitor 107. When the second switch 101b is off, the one end of the inductor 105 may be disconnected from the one end of the second capacitor 107 and the output terminal of the DC/DC converter 100.

According to various embodiments, the one end of the inductor 105 may be connected to the other end of the first switch 101a and the one end of the second switch 101b, and another end of the inductor 105 may be connected to the ground. When the first switch 101a is on, the first capacitor 103 and the inductor 105 may be connected in series to form a resonance circuit. When the second switch 101b is on, the inductor 105 and the second capacitor 107 may be connected in series to form a resonance circuit.

Referring to FIG. 1B, "Ts" denotes a switching period of the DC/DC converter 100, and "D" denotes a duty cycle (or duty ratio or duty rate). IL shown in FIG. 1B denotes a current flowing in the inductor 105.

In a period (e.g., t=0 to DTs and/or Ts to (1+D)Ts) in which the first switch 101a is on and the second switch 101b is off, an input voltage Vin may be applied to the one end

ⓐ of the inductor IUD at node 106, based on the inductor 105 being connected to the input power source 102 and the first capacitor 103, so that the inductor current IL may linearly increase (①) as illustrated in FIG. 1B at increasing portions 110 and 112 of the IL curve). In a period (e.g., t=DTs to Ts and/or (1+D)Ts to 2 Ts) in which the first switch 101a is off and the second switch 101b is on, an output voltage Vout may be applied to the one end (a)

of the inductor 105 at node 106, based on the inductor 105 being disconnected from the input power source 102 and the first capacitor 103 and the inductor being connected to the output terminal and the second capacitor 107, so that the inductor current IL may linearly decrease (②) as illustrated in FIG. 1B at decreasing portions 114 and 116 of the IL curve). Through on/off control of the first switch 101a and the second switch 101b, the input voltage Vin and the output voltage Vout (e.g., a voltage converted and output by the DC/DC converter 100) may have a relationship in Equation 1.

$$V_{out} = -\frac{D}{1-D}V_{in} \qquad \text{Equation 1}$$

A ripple of the inductor current IL is where the inductor current IL linearly increases (①) at increasing portions 110 and 112) or decreases (②) at decreasing portions 114 and 116) may occur. The magnitude of the ripple of the inductor current IL (e.g., the magnitude (or variance) of the linear increase or decrease of the inductor current IL) may be proportional to the magnitude of the input voltage Vin and the magnitude of the output voltage Vout and may be proportional to a switching period Ts. To increase the voltage conversion efficiency of the DC/DC converter 100, a low ripple of the inductor current IL is required. To reduce the ripple of the inductor current IL, the inductance of the inductor 105 may be increased or the switching period Ts may be configured to be short. However, increasing the inductance of the inductor 105 may increase the size of the inductor 105 and may increase loss due to the internal resistance of the inductor 105. Configuring the switching period Ts to be short may increase switching loss in the switches 101.

Figure 2:
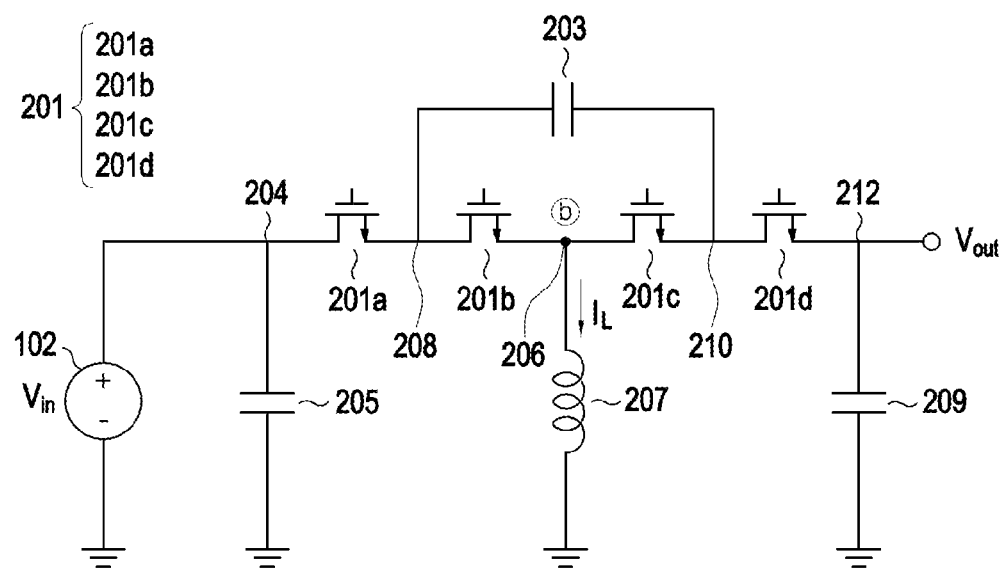
FIG. 2 illustrates components of a DC/DC converter according to various embodiments.

FIG. 2 illustrates components of a DC/DC converter 200 (e.g., a three-level inverting buck-boost converter) according to various embodiments.

According to various embodiments, the DC/DC converter 200 may include a plurality of switches 201, a first capacitor 203 (e.g., a flying capacitor), a second capacitor 205 (e.g., the first capacitor 103 of FIG. 1A), an inductor 207 (e.g., the inductor 105 of FIG. 1A), and/or a third capacitor 209 (e.g., the second capacitor 107 of FIG. 1A). Compared with the DC/DC converter 100 according to the comparative example with reference to FIG. 1A, the DC/DC converter 200 of FIG. 2 may further include one switch (e.g., a first switch 201a or a second switch 201b) between the first capacitor 203 and the inductor 207, may further include one switch (e.g., a third switch 201c or a fourth switch 201d) between the inductor 207 and the third capacitor 209, and may further include a first capacitor 203.

According to various embodiments, the plurality of switches 201 may include the first switch 201a, the second switch 201b, the third switch 201c, and the fourth switch 201d. According to various embodiments, each of the plurality of switches 201 may be configured as a metal-oxide-semiconductor field-effect transistor (MOSFET). According to an embodiment, at least one of the plurality of switches 201 may be configured as a diode.

According to various embodiments, each of the plurality of switches 201 may be controlled to be on or off according to control of at least one control circuit (not shown) (e.g., a gate driver or a driving circuit) (or according to an output control signal or gate voltage). For example, the at least one control circuit (not shown) may generate a control signal (e.g., a pulse width modulation (PWM) signal). The at least one control circuit (not shown) may be connected to each of the plurality of switches 201, and may input a control signal to each of the plurality of switches 201 (e.g., apply a voltage to a gate terminal of each of the plurality of switches 201). According to various embodiments, controlling the on/off states of the plurality of switches 201 may include applying and/or not applying a control signal (or gate voltage) to the plurality of switches 201. According to various embodiments, the expression that the at least one control circuit (not shown) controls the on/off states of the plurality of switches 201 may include the at least one control circuit (not shown) outputting a gate voltage and/or refraining from outputting a gate voltage. According to an embodiment, the at least one control circuit (not shown) may be configured as a micro controller unit (MCU), and the MCU may control the gate driver to control the on/off states of each of the plurality of switches 201. In describing various embodiments of the disclosure, an "electronic device" may be described as a concept including the at least one control circuit (not shown) and the DC/DC converter 200 (or a first DC/DC converter 600a and a second DC/DC converter 600b of FIG. 6A or FIG. 6B to be described below).

According to various embodiments, one end of the first switch 201a may be connected to an input power source 102 (e.g., a DC power source) at node 204 and one end the second capacitor 205 at node 204, and another end of the first switch 201a may be connected to one end of the second switch 201b at node 208 and one end of the first capacitor 203 at node 208. According to various embodiments, in the on state, the first switch 201a may be configured to connect the one end of the first capacitor 203 to the input power source 102 and the one end of the second capacitor 205. According to various embodiments, in the off state, the first switch 201a may be configured to disconnect the one end of the first capacitor 203 from the input power source 102 and the one end of the second capacitor 205.

According to various embodiments, the one end of the second switch 201b may be connected to the other end of the first switch 201a and the one end of the first capacitor 203, and another end of the second switch 201b may be connected to one end of the third switch 201c and one end (b)

of the inductor 207 at node zoo. According to various embodiments, in the on state, the second switch 201b may be configured to connect the one end of the first capacitor 203 at node 208 to the one end (b)

of the inductor 207 at node 206. According to various embodiments, in the off state, the second switch 201b may be configured to disconnect the one end of the first capacitor 203 from the one end (b)

of the inductor 207 at node 206.

According to various embodiments, the one end of the third switch 201c may be connected to the other end of the second switch 201b at node 206 and the one end (b)

of the inductor 207 at node 206, and another end of the third switch 201c may be connected to one end of the fourth switch 201d at node 212 and another end of the first capacitor 203 at node 212. According to various embodiments, in the on state, the third switch 201c may be configured to connect the other end of the first capacitor 203 at node 210 to the one end (b)

of the inductor 207 node 206. According to various embodiments, in the off state, the third switch 201c may be configured to disconnect the other end of the first capacitor 203 from the one end (b)

of the inductor 207 at node 206.

According to various embodiments, the one end of the fourth switch 201d may be connected to the other end of the third switch 201c at node 210 and the other end of the first capacitor 203 at node 210, and another end of the fourth switch 201d at node 212 may be connected to an output terminal of the DC/DC converter 200 and to one end of the third capacitor 209. According to various embodiments, in the on state, the fourth switch 201d may be configured to connect the other end of the first capacitor 203 to the output terminal of the DC/DC converter 200 and the one end of the third capacitor 209. According to various embodiments, in the off state, the fourth switch 201d may be configured to connect the other end of the first capacitor 203 from the output terminal of the DC/DC converter 200 and the one end of the third capacitor 209.

According to various embodiments, the one end (b)

of the inductor 207 at node 206 may be connected to the other end of the second switch 201b and to the one end of the third switch 201c, and another end of the inductor 207 may be connected to the ground. According to various embodiments, the inductor 207 may be connected to the first capacitor 203, the second capacitor 205, and/or the third capacitor 209 according to the on/off states of the plurality of switches 201, which will be described in detail with reference to the following drawings. For example, the inductance value of the inductor 207 may be 0.33 microhenry (μH) or 0.47 μH.

Referring to FIG. 1B together, the switching period T of the DC/DC converter 200 may be configured to be shorter than the switching period Ts of the DC/DC converter 100 according to the comparative example (e.g., T=Ts/2), which will be described in detail with reference to the following drawings. Accordingly, embodiments of this disclosure provide high voltage conversion efficiency without increasing the inductance of the inductor 207.

Figure 3:
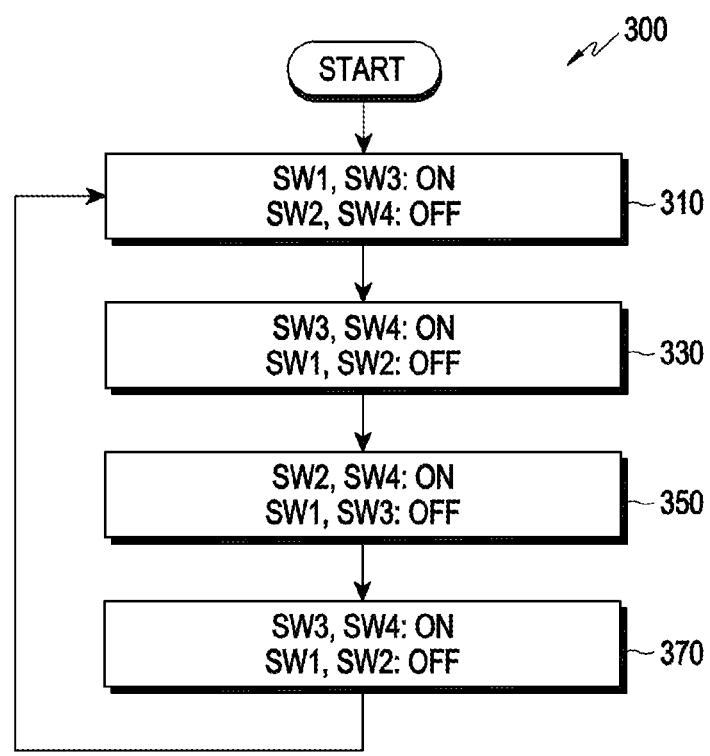
FIG. 3 is a flowchart illustrating a method in which an electronic device performs switching control of a DC/DC converter according to various embodiments.
Figure 4A:
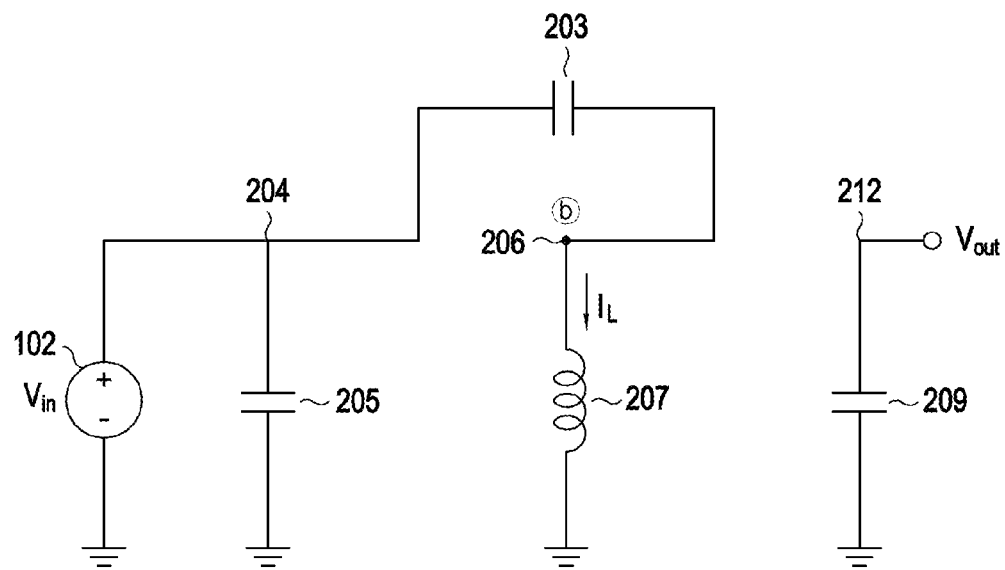
FIG. 4A, FIG. 4B, and FIG. 4C are equivalent circuit diagrams illustrating a connection structure of a DC/DC converter according to switching control of an electronic device.
Figure 4B:
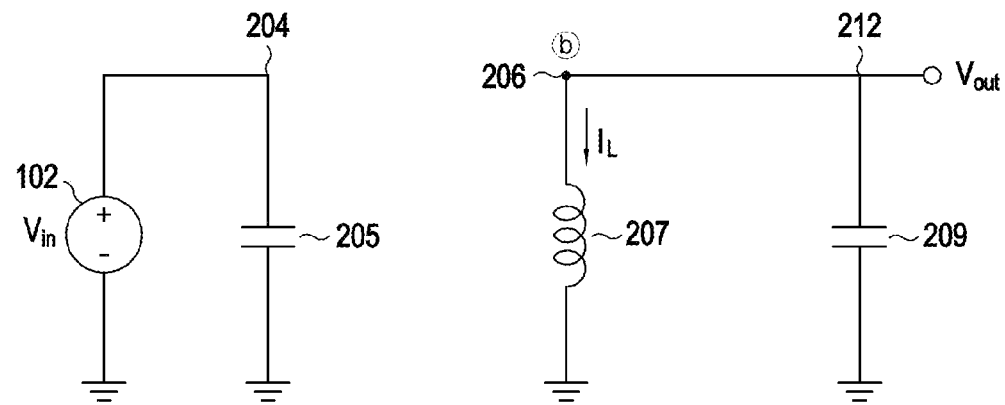
Figure 4C:
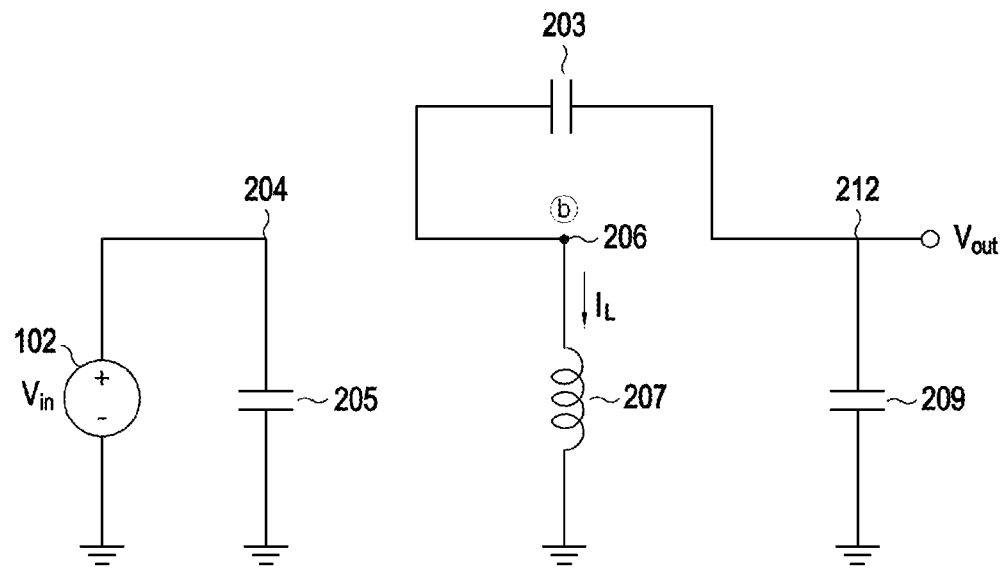
Figure 5:
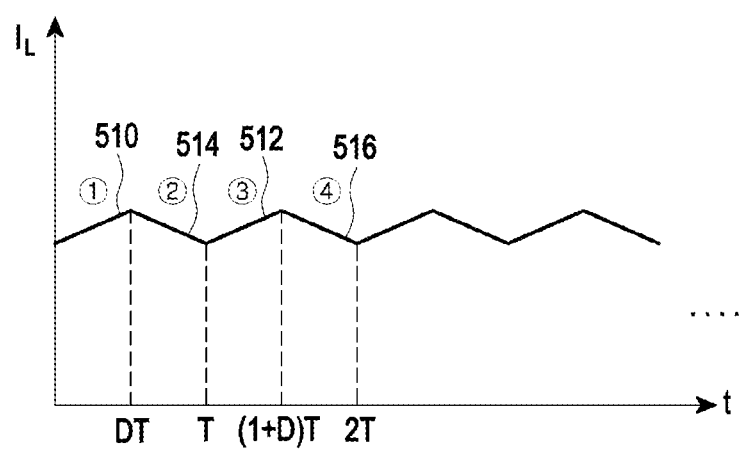
FIG. 5 illustrates a ripple of an inductor current of a DC/DC converter according to various embodiments.

FIG. 3 is a flowchart 300 illustrating a method in which an electronic device performs switching control of a DC/DC converter (e.g., the DC/DC converter 200 of FIG. 2) according to various embodiments. FIG. 4A, FIG. 4B, and FIG. 4C are equivalent circuit diagrams illustrating a connection structure of the DC/DC converter 200 according to switching control of the electronic device. FIG. 5 illustrates a ripple of an inductor current IL of the DC/DC converter 200 according to various embodiments. Hereinafter, operations of the electronic device will be described also with reference to FIG. 2.

Referring to FIG. 3, according to various embodiments, in operation 310, the electronic device may control the first switch 201a and the third switch 201c to be on and may control the second switch 201b and the fourth switch 201c to be off. For example, in a first period (e.g., t=0 to DT), the electronic device may control the first switch 201a and the third switch 201c to be on and may control the second switch 201b and the fourth switch 201d to be off. Referring to FIG. 4A, the input power source 102, the one end of the second capacitor 205, and the one end of the first capacitor 203 may be connected based on the first switch 201a controlled to be on. The one end of the first capacitor 203 and the one end of the inductor 207 may not be connected based on the second switch 201b controlled to be off. The other end of the first capacitor 203 and the one end of the inductor 207 may be connected based on the third switch 201c controlled to be on. The other end of the first capacitor 203, the output terminal of the DC/DC converter 200, and the one end of the third capacitor 209 may not be connected based on the fourth switch 201d controlled to be off. Here, a voltage having a magnitude (e.g., a voltage of Vin−(Vin−Vout)/2) smaller than the input voltage Vin may be applied to the one end (b)

of the inductor 207 at node 206. Referring to FIG. 5, "T" denotes a switching period of the DC/DC converter 200, and "D" denotes a duty cycle (or duty ratio). IL shown in FIG. 5 denotes a current flowing in the inductor 207 (hereinafter, "inductor current IL"). Referring to FIG. 5, the voltage having the magnitude of Vin−(Vin−Vout)/2 is applied to the one end (b)

of the inductor 207 at node 206, so that the inductor current IL may linearly increase in the first period (e.g., t=0 to DT)

(illustrated as  at increasing portion 510 of the IL curve). Compared with FIG. 1B, since the switching period T of the DC/DC converter 200 is shorter than the switching period Ts of the DC/DC converter 100 according to the comparative example (e.g., T=Ts/2) and the voltage (e.g., the voltage of Vin−(Vin−Vout)/2) smaller than the input voltage Vin is applied to the one end

of the inductor 207 at node 206, an increase in the inductor current IL in the first period (e.g., t=0 to DT) (e.g., a ripple of the inductor current IL in the first period) may be smaller than an increase in the inductor current IL in t=0 to DTs in FIG. 1B. For example, the magnitude of the ripple of the inductor current IL in the first period (e.g., t=0 to DT) (and/or second to fourth periods to be described below) may be 700 mA. Further, since the voltage (e.g., the voltage of Vin−(Vin−Vout)/2) smaller than the input voltage Vin is applied to the one end

of the inductor 207 at node 206 and thus low voltage stress is applied to each of the plurality of switches 201, switches having low internal pressure and low internal resistance may be used as the plurality of switches 201, thus reducing switching loss.

According to various embodiments, in operation 330, the electronic device may control the third switch 201c and the fourth switch 201d to be on and may control the first switch 201a and the second switch 201b to be off. For example, the electronic device may turn off the first switch 201a and may turn on the fourth switch 201d in a second period (e.g., t=DT to T) (e.g., at the start time (t=DT) of the second period) after the first period (e.g., t=0 to DT) expires. Referring to FIG. 4B, the one end of the first capacitor 203 may not be connected to the input power source 102 and the one end of the second capacitor 205, based on the first switch 201a controlled to be off. For example, the one end of the first capacitor 203 may be disconnected from the input power source 102 and the one end of the second capacitor 205. The one end of the first capacitor 203 and the one end of the inductor 207 may not be connected based on the second switch 201b being off. The other end of the first capacitor 203 and the one end of the inductor 207 may be connected based on the third switch 201c being on. The other end of the first capacitor 203 may be connected to the output terminal of the DC/DC converter 200 and the one end of the third capacitor 209 based on the fourth switch 201d controlled to be on. Here, a voltage having a magnitude of Vout may be applied to the one end of

of the inductor 207 at node 206. Referring to FIG. 5, the voltage having the magnitude of Vout is applied to the one end

of the inductor 207, so that the inductor current IL may linearly decrease in the second period (e.g., t=DT to T) () as illustrated at decreasing portion 514 of the IL curve). Compared with FIG. 1B, since the switching period T of the DC/DC converter 200 is shorter than the switching period Ts of the DC/DC converter 100 according to the comparative example (e.g., T=Ts/2), a decrease in the inductor current IL in the second period (e.g., t=DT to T) (e.g., a ripple of the inductor current IL in the second period) may be smaller than a decrease in the inductor current IL in t=DTs to Ts in FIG. 1B.

According to various embodiments, in operation 350, the electronic device may control the second switch 201b and the fourth switch 201d to be on and may control the first switch 201a and the third switch 201c to be off. For example, the electronic device may turn on the second switch 201b and may turn off the third switch 201c in a third period (e.g., t=T to (1+D)T) (e.g., the start time (t=T) of the third period) after the second period (e.g., t=DT to T) expires. Referring to FIG. 4C, the one end of the first capacitor 203 may not be connected to the input power source 102 and the one end of the second capacitor 205, based on the first switch 201a being off. For example, the one end of the first capacitor 203 may be disconnected from the input power source 102 and the one end of the second capacitor 205. The one end of the first capacitor 203 may be connected to the one end of the inductor 207, based on the second switch 201b controlled to be on. The other end of the first capacitor 203 and the one end of the inductor 207 may not be connected based on the third switch 201c controlled to be off. The other end of the first capacitor 203 may not be connected to the output terminal of the DC/DC converter 200 and the one end of the third capacitor 209, based on the fourth switch 201d being on. Here, a voltage having a magnitude (e.g., a voltage of Vout−(Vin−Vout)/2) smaller than the output voltage Vout may be applied to the one end

of the inductor 207 at node 206. Referring to FIG. 5, the voltage having the magnitude of Vout−(Vin−Vout)/2 is applied to the one end

of the inductor 207 at node 206, so that the inductor current IL may linearly increase in the third period (e.g., T to (1+D)T) () as illustrated at increasing portion 512 of the IL curve). Compared with FIG. 1B, since the switching period T of the DC/DC converter 200 is shorter than the switching period Ts of the DC/DC converter 100 according to the comparative example (e.g., T=Ts/2) and the voltage (e.g., the voltage of Vout−(Vin−Vout)/2) smaller than the output voltage Vout is applied to the one end

of the inductor 207 at node 206, an increase in the inductor current IL in the third period (e.g., t=T to (1+D)T) (e.g., a ripple of the inductor current IL in the third period) may be smaller than an increase in the inductor current IL in t=Ts~(1+D)Ts in FIG. 1B. Further, since the voltage (e.g., the voltage of Vout−(Vin−Vout)/2) smaller than the output voltage Vout is applied to the one end

of the inductor 207 at node 206 and thus low voltage stress is applied to each of the plurality of switches 201, switches having low internal pressure and low internal resistance may be used as the plurality of switches 201, thus reducing switching loss.

According to various embodiments, in operation 370, the electronic device may control the third switch 201c and the fourth switch 201d to be on and may control the first switch 201a and the second switch 201b to be off. For example, the electronic device may turn off the second switch 201b and may turn on the third switch 201c in a fourth period (e.g., t=(1+D)T to 2T) (e.g.: at the start time (t=(1+D)T) of the fourth period) after the third period (e.g., t=T to (1+D)T) expires. Referring to FIG. 4B, the one end of the first capacitor 203 may not be connected to the input power source 102 and the one end of the second capacitor 205, based on the first switch 201a being off. The one end of the first capacitor 203 may not be connected to the one end of the inductor 207 based on the second switch 201b controlled to be off. For example, the one end of the first capacitor 203 may be disconnected from the one end of the inductor 207. The other end of the first capacitor 203 and the one end of the inductor 207 may be connected based on the third switch 201c controlled to be on. The other end of the first capacitor 203 may be connected to the output terminal of the DC/DC converter 200 and the one end of the third capacitor 209, based on the fourth switch 201d being on. Here, a voltage having a magnitude of Vout may be applied to the one end

of the inductor 207 at node 206. Referring to FIG. 5, the voltage having the magnitude of Vout is applied to the one end

of the inductor 207 at node 206, so that the inductor current IL may linearly decrease in the fourth period (e.g., t=(1+D)T to 2T) (④ as illustrated at decreasing portion 516 of the IL curve). Compared with FIG. 1B, since the switching period T of the DC/DC converter 200 is shorter than the switching period Ts of the DC/DC converter 100 according to the comparative example (e.g., T=Ts/2), a decrease in the inductor current IL in the fourth period (e.g., t=(1+D)T to 2T) (e.g., a ripple of the inductor current IL in the fourth period) may be smaller than a decrease in the inductor current IL in t=(1+D)Ts to 2 Ts in FIG. 1B.

According to various embodiments, the electronic device may perform operation 310 again after performing operation 370. For example, the electronic device may turn on the first switch 201a and may turn off the fourth switch 201d after the fourth period (e.g., t=(1+D)T to 2T) expires (e.g., at a time (t=2T) when the fourth period expires).

As described above, since the switching period T of the DC/DC converter 200 is shorter than the switching period Ts of the DC/DC converter 100 according to the comparative example (e.g., T=Ts/2), embodiments of this disclosure provide high voltage conversion efficiency without increasing the inductance of the inductor 207.

Figure 6A:
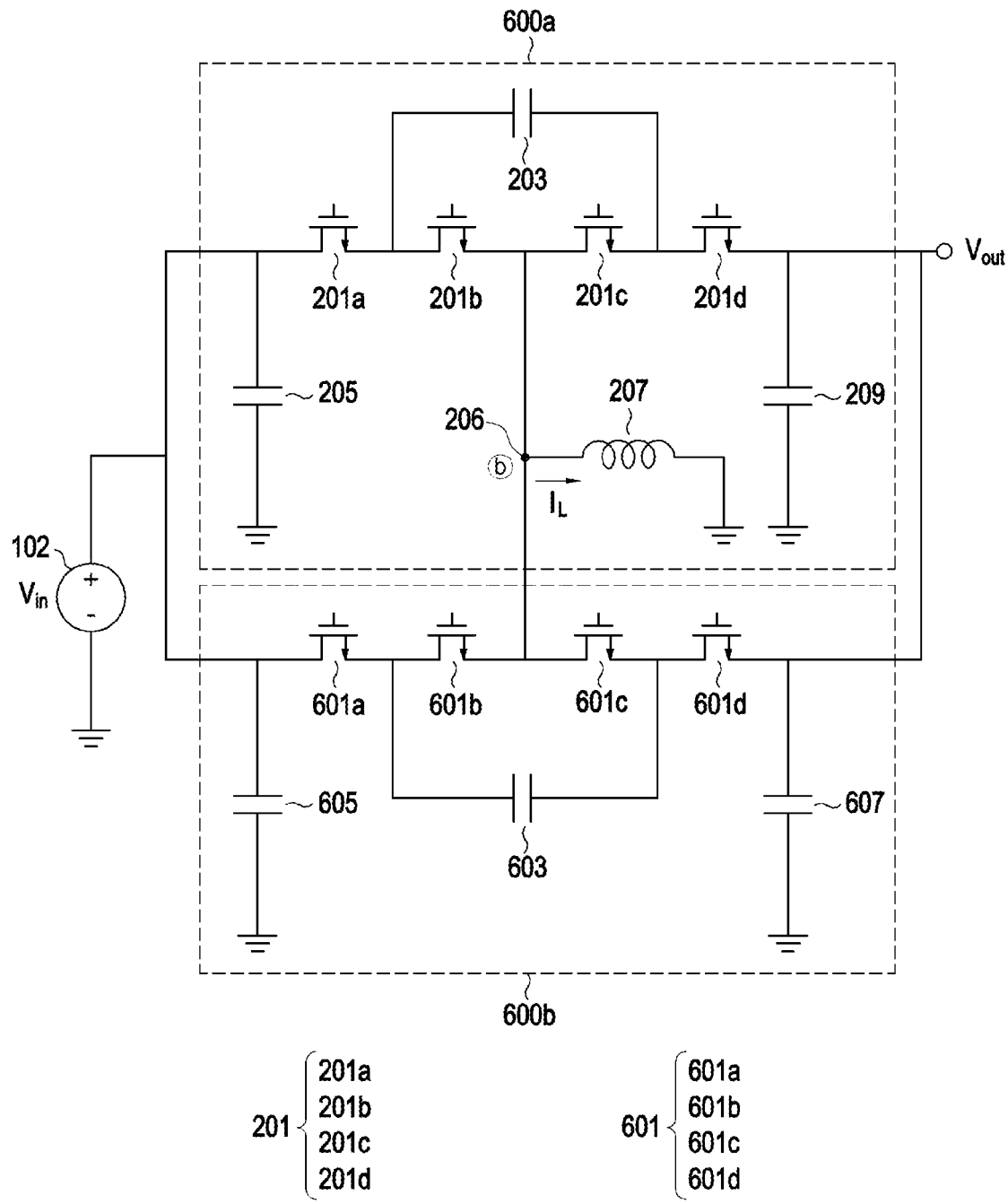
FIG. 6A illustrates an example in which an electronic device includes a plurality of DC/DC converters according to various embodiments.
Figure 6B:
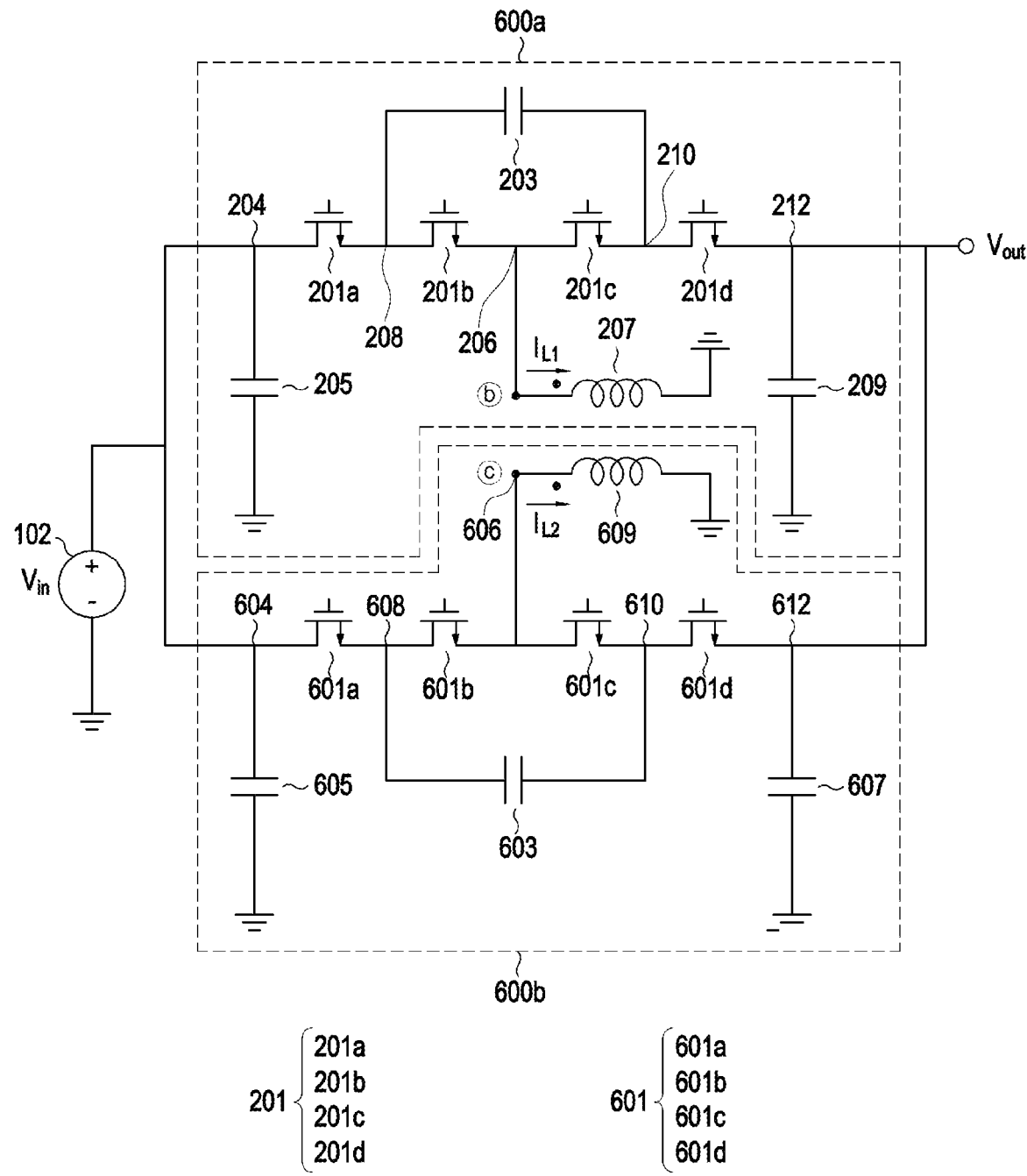
FIG. 6B illustrates another example in which an electronic device includes a plurality of DC/DC converters according to various embodiments.

FIG. 6A illustrates an example in which an electronic device includes a plurality of DC/DC converters according to various embodiments. FIG. 6B illustrates another example in which an electronic device includes a plurality of DC/DC converters according to various embodiments.

According to various embodiments, the electronic device may include a first DC/DC converter 600a (e.g., the DC/DC converter 200 of FIG. 2) and a second DC/DC converter 600b.

According to various embodiments, the first DC/DC converter 600a may include the components of the DC/DC converter 200 described above with reference to FIG. 2.

According to various embodiments, the second DC/DC converter 600b may include a plurality of switches 601, a fourth capacitor 603 (e.g., a flying capacitor), a fifth capacitor 605, and/or a sixth capacitor 607. According to various embodiments, the second DC/DC converter 600b may share an inductor 207 (hereinafter, "first inductor" 207) of the first DC/DC converter 600a (e.g., in the second DC/DC converter 600b of FIG. 6A), or may further include an inductor 609 (hereinafter, "second inductor" 609) separate from the inductor 207 (e.g., in the second DC/DC converter 600b of FIG. 6B).

According to various embodiments, the plurality of switches 601 may include a fifth switch 601a, a sixth switch 601b, a seventh switch 601c, and an eighth switch 601d. According to various embodiments, each of the plurality of switches 601 may be configured as a metal-oxide-semiconductor field-effect transistor (MOSFET). According to an embodiment, at least one of the plurality of switches 601 may be configured as a diode. According to various embodiments, the fifth switch 601a, the sixth switch 601b, the seventh switch 601c, and the eighth switch 601d may be described as switches corresponding to a first switch 201a, a second switch 201b, a third switch 201c, and a fourth switch 201d, respectively.

According to various embodiments, each of the plurality of switches 601 may be controlled to be on or off according to control of at least one control circuit (not shown) (e.g., a gate driver or a driving circuit) (or according to an output control signal or gate voltage). For example, the at least one control circuit (not shown) may generate a control signal (e.g., a pulse width modulation (PWM) signal). The at least one control circuit (not shown) may be connected to each of the plurality of switches 601, and may input a control signal to each of the plurality of switches 601 (e.g., apply a voltage to a gate terminal of each of the plurality of switches 601). According to various embodiments, controlling the on/off states of the plurality of switches 601 may include applying and/or not applying a control signal (or gate voltage) to the plurality of switches 601. According to various embodiments, the expression that the at least one control circuit (not shown) controls the on/off states of the plurality of switches 601 may include the at least one control circuit (not shown) outputting a gate voltage and/or refraining from outputting a gate voltage. According to various embodiments, control circuits to control the on/off states of the switches 201 of the first DC/DC converter 600a and the switches 601 of the second DC/DC converter 600b may be the same or different. For example, one control circuit may control the on/off states of the switches 201 of the first DC/DC converter 600a and the switches 601 of the second DC/DC converter 600b. In another example, a first control circuit may control the on/off states of the switches 201 of the first DC/DC converter 600a, and a second control circuit different from the first control circuit may control the on/off states of the switches 601 of the second DC/DC converter 600b.

According to various embodiments, one end of the fifth switch 601a may be connected to an input power source 102 (e.g., a DC power source) and one end the fifth capacitor 605 at node 604, and another end of the fifth switch 601a may be connected to one end of the sixth switch 601b at node 608 and to one end of the fourth capacitor 603 at node 608. According to various embodiments, in the on state, the fifth switch 601a may be configured to connect the one end of the fourth capacitor 603 at node 608 to the input power source 102 and to the one end of the fifth capacitor 605 at node 604. According to various embodiments, in the off state, the fifth switch 601a may be configured to disconnect the one end of the fourth capacitor 603 from the input power source 102 and the one end of the fifth capacitor 605.

According to various embodiments, the one end of the sixth switch 601b may be connected to the other end of the fifth switch 601a at node 608 and to the one end of the fourth capacitor 603 at node 608, and another end of the sixth switch 601b may be connected to one end of the seventh switch 601c at node 606.

Referring to FIG. 6A, the other end of the sixth switch 601b may be connected to one end (b)

of the first inductor 207 at node 206. According to various embodiments, in the on state, the sixth switch 601b may be configured to connect the one end of the fourth capacitor 603 to the one end (b)

of the first inductor 207 at node 206. According to various embodiments, in the off state, the sixth switch 601b may be configured to disconnect the one end of the fourth capacitor 603 from the one end (b)

of the first inductor 207 at node 206.

Referring to FIG. 6B, the other end of the sixth switch 601b may be connected to one end (c)

of the second inductor 609 at node 606. According to various embodiments, in the on state, the sixth switch 601b may be configured to connect the one end of the fourth capacitor 603 to the one end (c)

of the second inductor 609 at node 606. According to various embodiments, in the off state, the sixth switch 601b may be configured to disconnect the one end of the fourth capacitor 603 from the one end (c)

of the second inductor 609 at node 606.

According to various embodiments, the one end of the seventh switch 601c may be connected to the other end of the sixth switch 601b, and another end of the seventh switch 601c may be connected to one end of the eighth switch 601d and another end of the fourth capacitor 603.

Referring to FIG. 6A, the one end of the seventh switch 601c may be connected to the one end (b)

of the first inductor 207 at node 206. According to various embodiments, in the on state, the seventh switch 601c may be configured to connect the other end of the fourth capacitor 603 to the one end (b)

of the first inductor 207 at node 206. According to various embodiments, in the off state, the seventh switch 601c may be configured to disconnect the other end of the fourth capacitor 603 from the one end (b)

of the first inductor 207 at node 206.

Referring to FIG. 6B, the one end of the seventh switch 601c may be connected to the one end

of the second inductor 609 at node 606. According to various embodiments, in the on state, the seventh switch 601c may be configured to connect the other end of the fourth capacitor 603 at node 610 to the one end

of the second inductor 609 at node 606. According to various embodiments, in the off state, the seventh switch 601c may be configured to disconnect the other end of the fourth capacitor 603 from the one end

of the second inductor 609 at node 606.

According to various embodiments, the one end of the eighth switch 601d may be connected to the other end of the seventh switch 601c at node 610 and to the other end of the fourth capacitor 603 at node 610, and another end of the eighth switch 601d may be connected to an output terminal of the second DC/DC converter 600b and to one end of the sixth capacitor 607 at node 612. According to various embodiments, in the on state, the eighth switch 601d may be configured to connect the other end of the fourth capacitor 603 to the output terminal of the second DC/DC converter 600b and the one end of the sixth capacitor 607. According to various embodiments, in the off state, the eighth switch 601d may be configured to disconnect the other end of the fourth capacitor 603 from the output terminal of the second DC/DC converter 600b and the one end of the sixth capacitor 607.

According to various embodiments, an output terminal of the first DC/DC converter 600a and the output terminal of the second DC/DC converter 600b may be connected to each other.

According to various embodiments, when comparing the electronic devices of FIG. 6A and FIG. 6B, inductors having a smaller inductance value than that in the electronic device of FIG. 6A may be used for the electronic device of FIG. 6B. For example, the inductance value of the first inductor 207 of FIG. 6A may be 0.33 µH or 0.47 µH, while the inductance values of the first inductor 207 and the second inductor 609 of FIG. 6B may be 0.1 µH or 0.27 µH. In FIG. 6B where coupled inductors are used, embodiments of this disclosure use an inductor having a smaller inductance value than in FIG. 6A where a single inductor is used. For example, in FIG. 2, FIG. 6A, and/or FIG. 6B, the inductor (e.g., the first inductor 207 in FIG. 2 and FIG. 6A, and the first inductor 207 and the second inductor 609 in FIG. 6B) may have a size of 2.0 (mm)*1.2 (mm)*0.65 (mm).

Referring to FIG. 6B, the one end ⓒ of the second inductor 609 may be connected to the other end of the sixth switch 601b and the one end of the seventh switch 601c, and another end of the second inductor 609 may be connected to the ground. According to various embodiments, the second inductor 609 may be coupled with the first inductor 207. For example, the first inductor 207 and the second inductor 609 may be configured as coils wound on the same magnetic core and coupled to each other, and the first inductor 207 and the second inductor 609 may be described as forming coupled inductors. In this case, effective inductance may be increased by coupling of the first inductor 207 and the second inductor 609 compared to a case where one inductor (e.g., the first inductor 207) is used as shown in FIG. 2, thus reducing ripples of a current flowing in the first inductor 207 (hereinafter, "first inductor current" IL1) and ripples of a current flowing in the second inductor 609 (hereinafter, "second inductor current" IL2) may decrease and increasing the voltage conversion efficiency of the electronic device. For example, the magnitude of a ripple of an inductor current IL in the first period (e.g., t=0 to DT) (and/or the second period to the fourth period) in FIG. 2 and/or FIG. 6A may be 700 mA, while the magnitude of a ripple of an inductor current IL in the first period (e.g., t=0 to DT) (and/or the second period to the fourth period) in FIG. 6B may be 450 mA, which is less than 700 mA.

According to various embodiments, the second inductor 609 may be connected to the fourth capacitor 603, the fifth capacitor 605, and/or the sixth capacitor 607 according to the on/off states of the plurality of switches 601, which will be described in detail with reference to the drawings to be described below.

According to various embodiments, the first DC/DC converter 600a and the second DC/DC converter 600b may operate in opposite phases, which will be described in detail with reference to the drawings to be described below.

Figure 7:
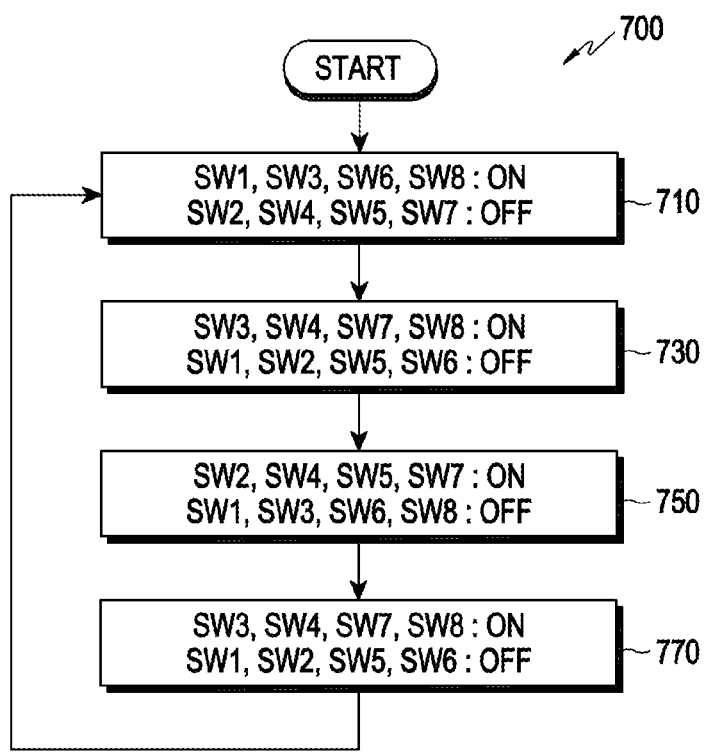
FIG. 7 is a flowchart illustrating a method in which an electronic device performs switching control of a plurality of DC/DC converters according to various embodiments.

FIG. 7 is a flowchart 700 illustrating a method in which an electronic device performs switching control of a plurality of DC/DC converters (e.g., the first DC/DC converter 600a and the second DC/DC converter 600b of FIG. 6A and/or FIG. 6B) according to various embodiments. Hereinafter, operations of the electronic device will be described also with reference to FIG. 6A and/or FIG. 6B.

According to various embodiments, in operation 710, the electronic device may control the first switch 201a, the third switch 201c, the sixth switch 601b, and the eighth switch 601d to be on and may control the second switch 201b, the fourth switch 201d, the fifth switch 601a, and the seventh switch 601c to be off. For example, in a first period (e.g., t=0 to DT), the electronic device may control the first switch 201a, the third switch 201c, the sixth switch 601b, and the eighth switch 601d to be on and may control the second switch 201b, the fourth switch 201d, the fifth switch 601a, and the seventh switch 601c to be off. Additionally referring to FIG. 4A and FIG. 4C, when the first switch 201a and the third switch 201c are on and the second switch 201b and the fourth switch 201d are off, the connection structure of the first DC/DC converter 600a may be as shown in FIG. 4A. When the sixth switch 601b and the eighth switch 601d are on and the fifth switch 601a and the seventh switch 601c are off, the connection structure of the second DC/DC converter 600b may be the same as (e.g., in FIG. 6A) or similar to (e.g., in FIG. 6B) that in FIG. 4C. In this case, the phase of the first DC/DC converter 600a and the phase of the second DC/DC converter 600b are described as being opposite to each other. Specifically, based on the first switch 201a and the third switch 201c being on and the second switch 201b and the fourth switch 201d being off, one end of the first capacitor 203, the input power supply 102, and one end of the second capacitor 205 may be connected, and another end of the first capacitor 203 and the one end

of the first inductor 207 at node 206 may be connected. The other end of the fourth capacitor 603, the output terminal of the second DC/DC converter 600b, and the one end of the sixth capacitor 607 may be connected based on the sixth switch 601b and the eighth switch 601d being on and the fifth switch 601a and the seventh switch 601c being off. Based on the sixth switch 601b and the eighth switch 601d being on and the fifth switch 601a and the seventh switch 601c being off, the one end of the fourth capacitor 603 and the one end

of the first inductor 207 at node 206 may be connected in FIG. 6A, and the one end of the fourth capacitor 603 and the one end ⓒ of the second inductor 609 may be connected in FIG. 6B. Here, a current flowing in the inductor of the electronic device (e.g., the inductor current IL in FIG. 6A, or the first inductor current IL1 and the second inductor current IL2 in FIG. 6B) may linearly increase in the first period (e.g.: t=0 to DT). Based on the phase of the first DC/DC converter 600a and the phase of the second DC/DC converter 600b being opposite to each other as described above, the magnitude of a linear increase (e.g., variance) in the current flowing in the inductor of the electronic device (e.g., the inductor current IL in FIG. 6A, or the first inductor current IL1 and the second inductor current IL2 in FIG. 6B) may decrease compared to a case where the single DC/DC converter 200 is used as shown in FIG. 2. In this case, capacitors with smaller capacitance (e.g., the second capacitor 205, the third capacitor 209, the fifth capacitor 605, and the sixth capacitor 607) may be used for in each of the DC/DC converters 600a and 600b.

According to various embodiments, in operation 730, the electronic device may control the third switch 201c, the fourth switch 201d, the seventh switch 601c, and the eighth switch 601d to be on and may control the first switch 201a, the second switch 201b, the fifth switch 601a, and the sixth switch 601b to be off. For example, the electronic device may turn on the fourth switch 201d and the seventh switch 601c and may turn off the first switch 201a and the sixth switch 601b in a second period (e.g., t=DT to T) (e.g., at the start time (t=DT) of the second period) after the first period (e.g., t=0 to DT) expires. Additionally referring to FIG. 4B, when the third switch 201c and the fourth switch 201d are on and the first switch 201a and the second switch 201b are off, the connection structure of the first DC/DC converter 600a may be the same as shown in FIG. 4B. When the seventh switch 601c and the eighth switch 601d are on and the fifth switch 601a and the sixth switch 601b are off, the connection structure of the second DC/DC converter 600b may be the same as (e.g., in FIG. 6A) or similar to (e.g., in FIG. 6B) that in FIG. 4B. Specifically, one end of the third capacitor 209, and the output terminal of the first DC/DC converter 600a may be connected based on the third switch 201c and the fourth switch 201d being on and the first switch 201a and the second switch 201b being off, the one end

of the first inductor 207 at node 206. Based on the seventh switch 601c and the eighth switch 601d being on and the fifth switch 601a and the sixth switch 601b being off, the one end ⓑ of the first inductor 207 at node 206, the one end of the sixth capacitor 607, and the output terminal of the second DC/DC converter 600b may be connected in FIG. 6A, and the one end ⓒ of the second inductor 609, the one end of the sixth capacitor 607, and the output terminal of the second DC/DC converter 600b may be connected in FIG. 6B. Here, the current flowing in the inductor of the electronic device (e.g., the inductor current IL in FIG. 6A, or the first inductor current IL1 and the second inductor current IL2 in FIG. 6B) may linearly decrease in the second period (e.g.: t=DT to T). In this case, the magnitude of a linear decrease (e.g., variance) in the current flowing in the inductor of the electronic device (e.g., the inductor current IL in FIG. 6A, or the first inductor current IL1 and the second inductor current IL2 in FIG. 6B) may decrease compared to a case where the single DC/DC converter 200 is used as shown in FIG. 2.

According to various embodiments, in operation 750, the electronic device may control the second switch 201b, the fourth switch 201d, the fifth switch 601a, and the seventh switch 601c to be on and may control the first switch 201a, the third switch 201c, the sixth switch 601b, and the eighth switch 601d to be off. For example, the electronic device may turn on the second switch 201b and the fifth switch 601a and may turn off the third switch 201c and the eighth switch 601d in a third period (e.g., t=T to (1+D)T) (e.g., the start time (t=T) of the third period) after the second period (e.g., t=DT to T) expires. Additionally referring to FIG. 4A and FIG. 4C, when the second switch 201b and the fourth switch 201d are on and the first switch 201a and the third switch 201c are off, the connection structure of the first DC/DC converter 600a may be as shown in FIG. 4C. When the fifth switch 601a and the seventh switch 601c are on and the sixth switch 601b and the eighth switch 601d are off, the connection structure of the second DC/DC converter 600b may be the same as (e.g., in FIG. 6A) or similar to (e.g., in FIG. 6B) that in FIG. 4A. In this case, the phase of the first DC/DC converter 600a and the phase of the second DC/DC converter 600b are described as being opposite to each other. Specifically, based on the second switch 201b and the fourth switch 201d being on and the first switch 201a and the third switch 201c being off, another end of the first capacitor 203, the output terminal of the first DC/DC converter 600a, and the one end of the third capacitor 209 may be connected, and the one end of the first capacitor 203 and the one end

of the first inductor 207 at node 206 may be connected. The one end of the fourth capacitor 603, the input power source 1, and the one end of the fifth capacitor 605 may be connected based on the fifth switch 601*a* and the seventh switch 601*c* being on and the sixth switch 601*b* and the eighth switch 601*d* being off. Based on the fifth switch 601*a* and the seventh switch 601*c* are on and the sixth switch 601*b* and the eighth switch 601*d* are off, the other end of the fourth capacitor 603 and the one end

of the first inductor 207 at node 206 may be connected in FIG. 6A, and the other end of the fourth capacitor 603 and the one end

of the second inductor 609 at node 606 may be connected in FIG. 6B. Here, the current flowing in the inductor of the electronic device (e.g., the inductor current IL in FIG. 6A, or the first inductor current IL1 and the second inductor current IL2 in FIG. 6B) may linearly increase in the third period (e.g., t=T to (1+D)T). Based on the phase of the first DC/DC converter 600*a* and the phase of the second DC/DC converter 600*b* being opposite to each other as described above, the magnitude of a linear increase (e.g., variance) in the current flowing in the inductor of the electronic device (e.g., the inductor current IL in FIG. 6A, or the first inductor current IL1 and the second inductor current IL2 in FIG. 6B) may decrease compared to a case where the single DC/DC converter 200 is used as shown in FIG. 2.

According to various embodiments, in operation 770, the electronic device may control the third switch 201*c*, the fourth switch 201*d*, the seventh switch 601*c*, and the eighth switch 601*d* to be on and may control the first switch 201*a*, the second switch 201*b*, the fifth switch 601*a*, and the sixth switch 601*b* to be off. For example, the electronic device may turn on the third switch 201*c* and the eighth switch 601*d* and may turn off the second switch 201*b* and the fifth switch 601*a* in a fourth period (e.g., t=(1+D)T to 2T) (e.g.: at the start time (t=(1+D)T) of the fourth period after the third period (e.g., t=T to (1+D)T) expires. Additionally referring to FIG. 4B together, when the third switch 201*c* and the fourth switch 201*d* are on and the first switch 201*a* and the second switch 201*b* are off, the connection structure of the first DC/DC converter 601*a* may be the same as shown in FIG. 4B. When the seventh switch 601*c* and the eighth switch 601*d* are on and the fifth switch 601*a* and the sixth switch 601*b* are off, the connection structure of the second DC/DC converter 600*b* may be the same as (e.g., in FIG. 6A) or similar to (e.g., in FIG. 6B) that in FIG. 4B. Here, the current flowing in the inductor of the electronic device (e.g., the inductor current IL in FIG. 6A, or the first inductor current IL1 and the second inductor current IL2 in FIG. 6B) may linearly decrease in the fourth period (e.g.: t=(1+D)T to 2T). In this case, the magnitude of a linear decrease in the current flowing in the inductor of the electronic device (e.g., the inductor current IL in FIG. 6A, or the first inductor current IL1 and the second inductor current IL2 in FIG. 6B) may decrease compared to a case where the single DC/DC converter 200 is used as shown in FIG. 2. In this case, the magnitude of a linear decrease (e.g., variance) in the current flowing in the inductor of the electronic device (e.g., the inductor current IL in FIG. 6A, or the first inductor current IL1 and the second inductor current IL2 in FIG. 6B) may decrease compared to a case where the single DC/DC converter 200 is used as shown in FIG. 2.

According to various embodiments, the electronic device may perform operation 710 again after performing operation 770. For example, the electronic device may turn on the first switch 201*a* and the sixth switch 601*b* and may turn off the fourth switch 201*d* and the seventh switch 601*c* after the fourth period (e.g., t=(1+D)T to 2T) expires (e.g., at a time (t=2T) when the fourth period expires).

Figure 8:
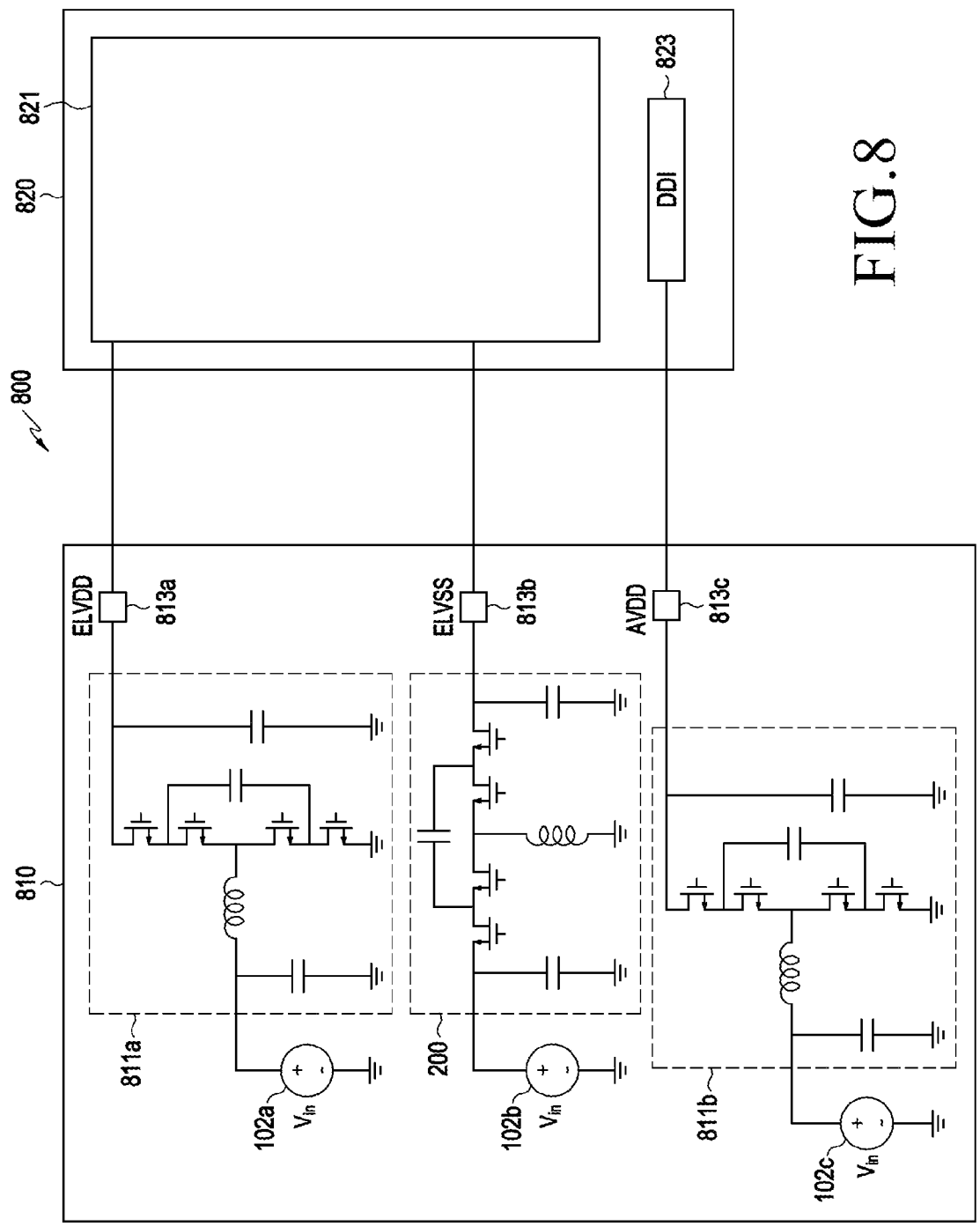
FIG. 8 illustrates an example in which a DC/DC converter is used according to various embodiments.

FIG. 8 illustrates an example in which a DC/DC converter 200 is used according to various embodiments.

According to various embodiments, the DC/DC converter 200 may be included in a power management integrated circuit (PMIC) 810 (e.g., a power management module 988 of FIG. 9) of an electronic device 800. According to an embodiment, the PMIC 810 may include a plurality of DC/DC converters (e.g., the first and second DC/DC converters 600*a* and 600*b* of FIG. 6A and/or FIG. 6B).

According to various embodiments, the PMIC 810 may manage power supplied to the electronic device 800. For example, the PMIC 810 may manage power supplied to a display module 820 (e.g., a display module 960 of FIG. 9). For example, the PMIC 810 may supply power to a display panel 821 and/or a display driver integrated circuit (IC) (DDI) of the display module 820.

According to various embodiments, the DC/DC converter 200 may convert an input voltage Vin of an input power source 102*b* (e.g., the input power source 102 of FIG. 2) and may supply the converted voltage (e.g., an output voltage Vout) to the display panel 821 (or to an input terminal of the display panel 821) through an output terminal (ELVSS) 813*b* of the DC/DC converter 200.

According to various embodiments, the PMIC 810 may further include one or more three-level boost converters. For example, the PMIC 810 may further include three-level boost converters 811*a* and 811*b*. Compared to a general boost converter, the three-level boost converters 811*a* and 811*b* may further include one switch between an inductor and an output capacitor, one switch between the inductor and the ground, and a flying capacitor. The three-level boost converters 811*a* and 811*b* may convert input voltages Vin of input power sources 102*a* and 102*c* (e.g., DC power sources) and may supply the converted voltages to the display panel 821 and the display driver IC 823 (or to the input terminal of the display panel 821 and an input terminal of the display driver IC 823) through output terminals (ELVDD and AVDD) 813*a* and 813*c* of the three-level booster converters 811*a* and 811*b*, respectively. According to an embodiment, the same input power may be input to the DC/DC converter 200 and the three-level boost converters 811*a* and 811*b*. For example, input power (e.g., the input power source 102 of FIG. 2) may be input to the DC/DC converter 200 and the three-level boost converters 811*a* and 811*b*.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control, for example, at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active (e.g., executing an application) state. According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence model is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or an external electronic device (e.g., an electronic device 902 (e.g., a speaker or a headphone)) directly or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device 904 via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify or authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the external electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

According to various embodiments, an electronic device (e.g., the electronic device 901 of FIG. 9) may include: a first DC/DC converter (e.g., the DC/DC converter 200 of FIG. 2) including a plurality of switches, a first capacitor (e.g., the first capacitor 203 of FIG. 2), and a first inductor (e.g., the inductor 207 of FIG. 2); and at least one control circuit configured to control on/off states of the plurality of switches, wherein the plurality of switches may include: a first switch (e.g., the first switch 201a of FIG. 2) including one end connected to an input power source (e.g., the input power source 102 of FIG. 2) and to connect one end of the first capacitor to the input power source in an on state; a second switch (e.g., the second switch 201b of FIG. 2) including one end connected to another end of the first switch and to connect the one end of the first capacitor to one end of the first inductor in the on state; a third switch (e.g., the third switch 201c of FIG. 2) including one end connected to another end of the second switch and to connect another end of the first capacitor to the one end of the first inductor in the on state; and a fourth switch (e.g., the fourth switch 201d of FIG. 2) including one end connected to another end of the third switch and to connect the other end of the first capacitor to an output terminal of the first DC/DC converter in the on state, the first capacitor may include the one end connected to the other end of the first switch and the one end of the second switch, and the other end connected to the other end of the third switch and the one end of the fourth switch, and the first inductor may include the one end connected to the other end of the second switch and the one end of the third switch, and another end connected to a ground.

According to various embodiments, the at least one control circuit may be configured to control the first switch and the third switch to be on and to control the second switch and the fourth switch to be off in a first period.

According to various embodiments, the at least one control circuit may be further configured to turn off the first switch and to turn on the fourth switch after the first period expires.

According to various embodiments, the at least one control circuit may be configured to control the second switch and the fourth switch to be on and to control the first switch and the third switch to be off in a third period.

According to various embodiments, the at least one control circuit may be further configured to turn off the second switch and turn on the third switch after the third period expires.

According to various embodiments, the at least one control circuit may be configured to control the third switch and the fourth switch to be on and to control the first switch and the second switch to be off in a second period or fourth period.

According to various embodiments, the first DC/DC converter may further include a second capacitor (e.g., the second capacitor 205 of FIG. 2) connected to the input power source and a third capacitor (e.g., the third capacitor 209 of FIG. 2) connected to the output terminal.

According to various embodiments, the electronic device may further include a second DC/DC converter (e.g., the second DC/DC converter 600b of FIG. 6A or FIG. 6B), wherein the second DC/DC converter may include: a fifth switch (e.g., the fifth switch 601a of FIG. 6A or FIG. 6B) including one end connected to the input power source and to connect one end of a fourth capacitor (e.g., the fourth capacitor 603 of FIG. 6A or FIG. 6B) to the input power source in the on state; a sixth switch (e.g., the sixth switch 601b of FIG. 6A or FIG. 6B) including one end connected to another end of the fifth switch; a seventh switch (e.g., the seventh switch 601c of FIG. 6A or FIG. 6B) including one end connected to another end of the sixth switch; and an eighth switch (e.g., the eighth switch 601d of FIG. 6A or FIG. 6B) which including one end connected to another end of the seventh switch and to connect the other end of the fourth capacitor to an output terminal of the second DC/DC converter in the on state.

According to various embodiments, the output terminal of the second DC/DC converter is connected to the output terminal of the first DC/DC converter.

According to various embodiments, the sixth switch is configured to connect the one end of the fourth capacitor to the one end of the first inductor in the on state, and the seventh switch may be configured to connect the other end of the fourth capacitor to the one end of the first inductor in the on state.

According to various embodiments, the other end of the second switch and the one end of the third switch may be connected to the other end of the sixth switch and the one end of the seventh switch.

According to various embodiments, the second DC/DC converter may further include a second inductor (e.g., the second inductor 609 of FIG. 6B), the sixth switch may be configured to connect the one end of the fourth capacitor to one end of the second inductor in the on state, and the seventh switch may be configured to connect the other end of the fourth capacitor to the one end of the second inductor in the on state.

According to various embodiments, the first inductor and the second inductor may form coupled inductors.

According to various embodiments, the at least one control circuit may be further configured to control on/off states of the fifth switch, the sixth switch, the seventh switch, and the eighth switch of the second DC/DC converter.

According to various embodiments, the at least one control circuit may be configured to control the first switch and the third switch to be on, to control the second switch and the fourth switch to be off, to control the seventh switch and the eighth switch to be on, and to control the fifth switch and the sixth switch to be off in a first period.

According to various embodiments, the at least one control circuit may be configured to control the third switch and the fourth switch to be on, to control the first switch and the second switch to be off, to control the seventh switch and the eighth switch to be on, and to control the fifth switch and the sixth switch to be off in a second period or a fourth period.

According to various embodiments, the at least one control circuit may be configured to control the second switch and the fourth switch to be on, to control the first switch and the third switch to be off, to control the fifth switch and the seventh switch to be on, and to control the sixth switch and the eighth switch to be off in a third period.

According to various embodiments, the at least one control circuit may be configured to turn on the sixth switch when the first switch is turned on.

According to various embodiments, the at least one control circuit may be configured to turn on the fifth switch when the second switch is turned on.

According to various embodiments, the at least one control circuit may include a first control circuit and a second control circuit, the first control circuit may be configured to control on/off states of the first switch, the second switch, the third switch, and the fourth switch of the first DC/DC converter, and the second control circuit may be configured to control on/off states of the fifth switch, the sixth switch, the seventh switch, and the eighth switch of the second DC/DC converter.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 800). For example, a processor (e.g., the processor) of the machine (e.g., the electronic device 800) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
 a first direct current to direct current (DC/DC) converter including a plurality of switches, a first capacitor, and a first inductor;
 at least one control circuit configured to control on/off states of the plurality of switches,
 wherein the plurality of switches comprises:
  a first switch including one end connected to an input power source and configured to connect one end of the first capacitor to the input power source in the on state of the first switch;
  a second switch including one end connected to another end of the first switch and configured to connect the one end of the first capacitor to one end of the first inductor in the on state of the second switch;
  a third switch including one end connected to another end of the second switch and configured to connect another end of the first capacitor to the one end of the first inductor in the on state of the third switch; and
  a fourth switch including one end connected to another end of the third switch and configured to connect the other end of the first capacitor to an output terminal of the first DC/DC converter in the on state of the fourth switch,
 wherein the first capacitor includes the one end connected to the other end of the first switch and to the one end of the second switch, and includes the other end connected to the other end of the third switch and the one end of the fourth switch, and
 wherein the first inductor includes the one end connected to the other end of the second switch and to the one end of the third switch, and includes another end connected to a ground; and
 a second DC/DC converter, wherein the second DC/DC converter comprises:
  a fifth switch including one end connected to the input power source and configured to connect one end of a fourth capacitor to the input power source in an on state of the fifth switch;
  a sixth switch including one end connected to another end of the fifth switch;
  a seventh switch including one end connected to another end of the sixth switch; and
  an eighth switch including one end connected to another end of the seventh switch and configured to connect another end of the fourth capacitor to an output terminal of the second DC/DC converter in the on state of the eighth switch,
 wherein the second DC/DC converter comprises:
  a second plurality of switches that includes the fifth, sixth, seventh, and eighth switches; and
  a second inductor that includes one end connected to the other end of the sixth switch and to the one end of the seventh switch, and includes another end connected directly to the ground.

2. The electronic device of claim 1, wherein the at least one control circuit is configured to control the first switch and the third switch to be in the on state and to control the second switch and the fourth switch to be in an off state in a first period.

3. The electronic device of claim 2, wherein the at least one control circuit is further configured to control the first switch to change to an off state and to control the fourth switch to change to the on state after the first period expires.

4. The electronic device of claim 3, wherein the at least one control circuit is configured to control the third switch and the fourth switch to be in the on state and to control the first switch and the second switch to be in the off state in a second period after the first period expires.

5. The electronic device of claim 1, wherein the at least one control circuit is configured to control the second switch and the fourth switch to be in the on state and to control the first switch and the third switch to be in the off state in a third period.

6. The electronic device of claim 5, wherein the at least one control circuit is further configured to control the second switch to change to an off state and control the third switch to change to the on state after the third period expires.

7. The electronic device of claim 6, wherein the at least one control circuit is configured to control the third switch and the fourth switch to be in the on state and to control the first switch and the second switch to be in the off state in a fourth period after the third period expires.

8. The electronic device of claim 1, wherein the first DC/DC converter further comprises a second capacitor connected to the input power source, and a third capacitor connected to the output terminal.

9. The electronic device of claim 1, wherein the output terminal of the second DC/DC converter is connected to the output terminal of the first DC/DC converter.

10. The electronic device of claim 1, wherein:
 the sixth switch is configured to connect the one end of the fourth capacitor to one end of the second inductor in the on state of the sixth switch, and
 the seventh switch is configured to connect the other end of the fourth capacitor to the one end of the second inductor in the on state of the seventh switch.

11. The electronic device of claim 10, wherein the first inductor and the second inductor form coupled inductors by being wound on a same core as each other.

12. The electronic device of claim 1, wherein the at least one control circuit is further configured to control on/off states of the fifth switch, the sixth switch, the seventh switch, and the eighth switch of the second DC/DC converter.

13. The electronic device of claim 12, wherein the at least one control circuit is configured to:
 control the first switch and the third switch to be in the on state,
 control the second switch and the fourth switch to be in the off state,
 control the seventh switch and the eighth switch to be in the on state, and
 control the fifth switch and the sixth switch to be in the off state in a first period.

14. The electronic device of claim 12, wherein the at least one control circuit is configured to:
 control the third switch and the fourth switch to be in the on state,
 control the first switch and the second switch to be in the off state,
 control the seventh switch and the eighth switch to be in the on state, and
 control the fifth switch and the sixth switch to be in the off state in a second period or in a fourth period.

15. The electronic device of claim 12, wherein the at least one control circuit is configured to:
 control the second switch and the fourth switch to be in the on state,
 control the first switch and the third switch to be in the off state,
 control the fifth switch and the seventh switch to be in the on state, and control the sixth switch and the eighth switch to be in the off state in a third period.

16. The electronic device of claim 1, wherein the at least one control circuit is configured to control the fifth switch to be in the on state when the second switch is in the on state.

17. The electronic device of claim 1, wherein the at least one control circuit comprises a first control circuit and a second control circuit,
the first control circuit is configured to control on/off states of the first switch, the second switch, the third switch, and the fourth switch of the first DC/DC converter, and
the second control circuit is configured to control on/off states of the fifth switch, the sixth switch, the seventh switch, and the eighth switch of the second DC/DC converter.

18. An electronic device comprising:
a first direct current to direct current (DC/DC) converter including a plurality of switches, a first capacitor, and a first inductor;
at least one control circuit configured to control on/off states of the plurality of switches,
wherein the plurality of switches comprises:
a first switch including one end connected to an input power source and configured to connect one end of the first capacitor to the input power source in the on state of the first switch;
a second switch including one end connected to another end of the first switch and configured to connect the one end of the first capacitor to one end of the first inductor in the on state of the second switch;
a third switch including one end connected to another end of the second switch and configured to connect another end of the first capacitor to the one end of the first inductor in the on state of the third switch; and
a fourth switch including one end connected to another end of the third switch and configured to connect the other end of the first capacitor to an output terminal of the first DC/DC converter in the on state of the fourth switch,
wherein the first capacitor includes the one end connected to the other end of the first switch and to the one end of the second switch, and includes the other end connected to the other end of the third switch and the one end of the fourth switch, and
wherein the first inductor includes the one end connected to the other end of the second switch and to the one end of the third switch, and includes another end connected to a ground; and
a second DC/DC converter, wherein the second DC/DC converter comprises:
a fifth switch including one end connected to the input power source and configured to connect one end of a fourth capacitor to the input power source in an on state of the fifth switch;
a sixth switch including one end connected to another end of the fifth switch;
a seventh switch including one end connected to another end of the sixth switch; and
an eighth switch including one end connected to another end of the seventh switch and configured to connect another end of the fourth capacitor to an output terminal of the second DC/DC converter in the on state of the eighth switch,
wherein the second DC/DC converter comprises a second plurality of switches that includes the fifth, sixth, seventh, and eighth switches, wherein the sixth switch is configured to connect the one end of the fourth capacitor to the one end of the first inductor in the on state of the sixth switch, and
the seventh switch is configured to connect the other end of the fourth capacitor to the one end of the first inductor in the on state of the seventh switch.

19. The electronic device of claim 18, wherein the other end of the second switch and the one end of the third switch are connected to the other end of the sixth switch and the one end of the seventh switch.

20. An electronic device comprising:
a first direct current to direct current (DC/DC) converter including a plurality of switches, a first capacitor, and a first inductor;
at least one control circuit configured to control on/off states of the plurality of switches,
wherein the plurality of switches comprises:
a first switch including one end connected to an input power source and configured to connect one end of the first capacitor to the input power source in the on state of the first switch;
a second switch including one end connected to another end of the first switch and configured to connect the one end of the first capacitor to one end of the first inductor in the on state of the second switch;
a third switch including one end connected to another end of the second switch and configured to connect another end of the first capacitor to the one end of the first inductor in the on state of the third switch; and
a fourth switch including one end connected to another end of the third switch and configured to connect the other end of the first capacitor to an output terminal of the first DC/DC converter in the on state of the fourth switch,
wherein the first capacitor includes the one end connected to the other end of the first switch and to the one end of the second switch, and includes the other end connected to the other end of the third switch and the one end of the fourth switch, and
wherein the first inductor includes the one end connected to the other end of the second switch and to the one end of the third switch, and includes another end connected to a ground; and
a second DC/DC converter, wherein the second DC/DC converter comprises:
a fifth switch including one end connected to the input power source and configured to connect one end of a fourth capacitor to the input power source in an on state of the fifth switch;
a sixth switch including one end connected to another end of the fifth switch;
a seventh switch including one end connected to another end of the sixth switch; and
an eighth switch including one end connected to another end of the seventh switch and configured to connect another end of the fourth capacitor to an output terminal of the second DC/DC converter in the on state of the eighth switch,
wherein the second DC/DC converter comprises a second plurality of switches that includes the fifth, sixth, seventh, and eighth switches, and
wherein the at least one control circuit is configured to control the sixth switch to be in the on state when the first switch is in the on state.

* * * * *